(No Model.) 4 Sheets—Sheet 1.
J. W. CULMER.
COMPUTING SCALE.
No. 486,663. Patented Nov. 22, 1892.
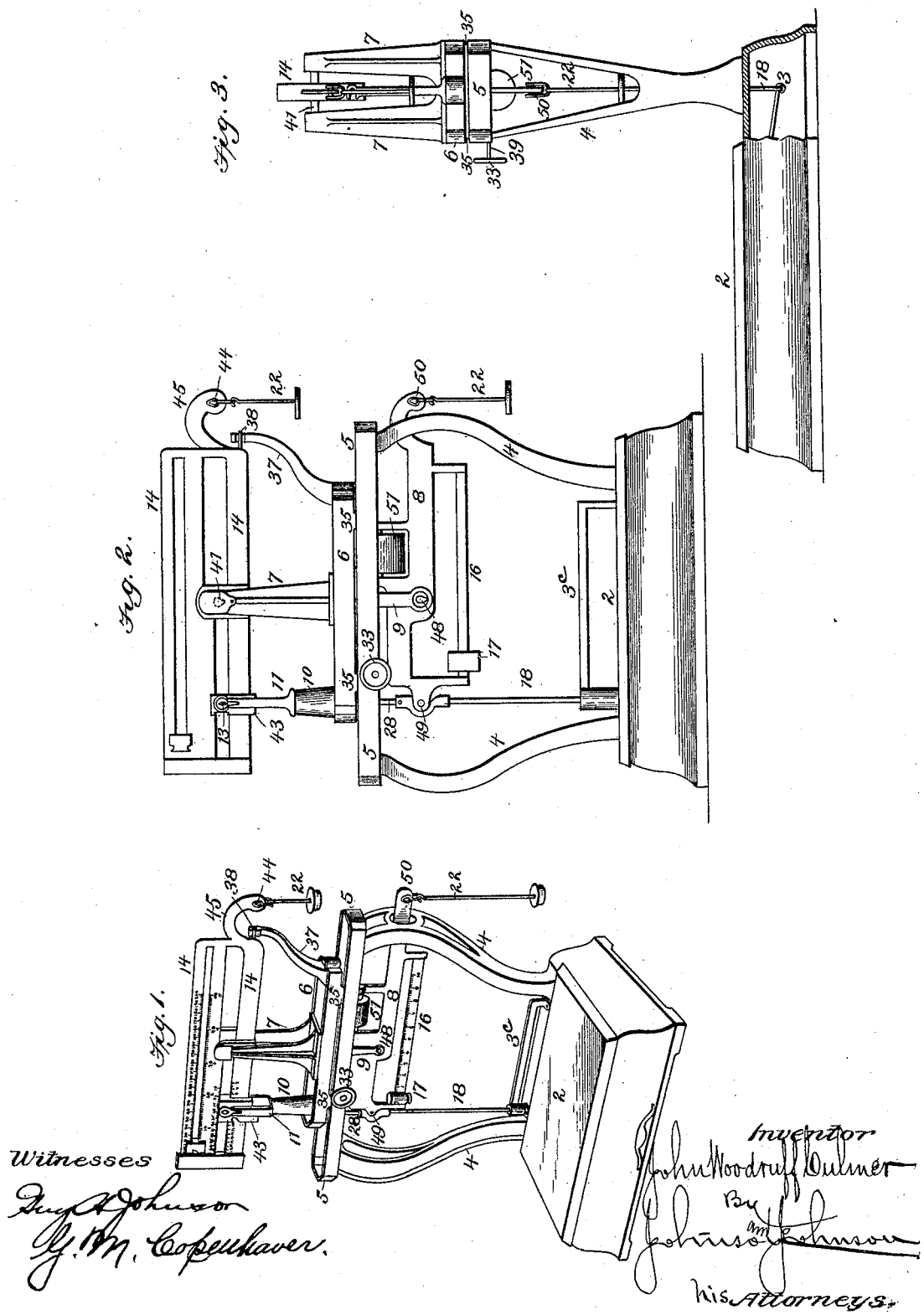
Witnesses
Inventor
John Woodruff Culmer
By Johnson & Johnson
his Attorneys (No Model.) 4 Sheets—Sheet 2.
J. W. CULMER.
COMPUTING SCALE.
No. 486,663. Patented Nov. 22, 1892.
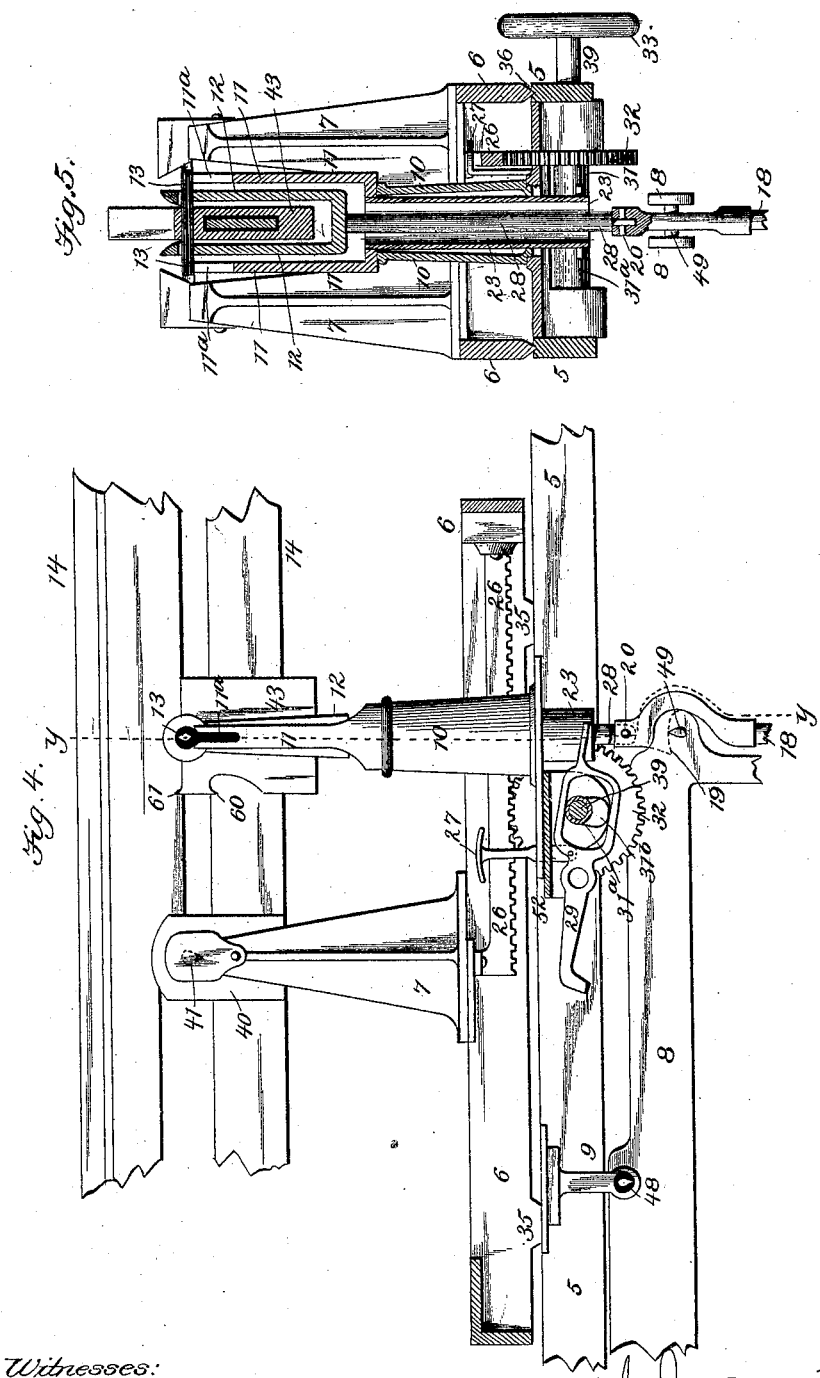
Witnesses:
Inventor, (No Model.) 4 Sheets—Sheet 3.
J. W. CULMER.
COMPUTING SCALE.
No. 486,663. Patented Nov. 22, 1892.
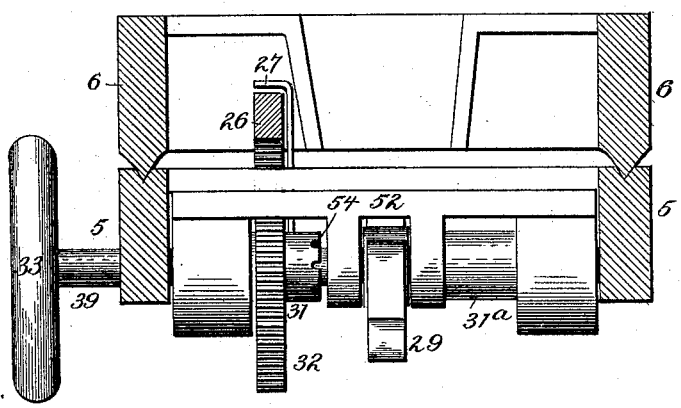
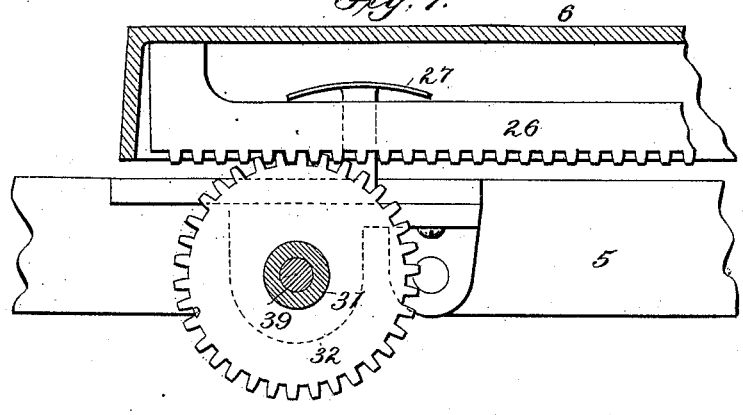
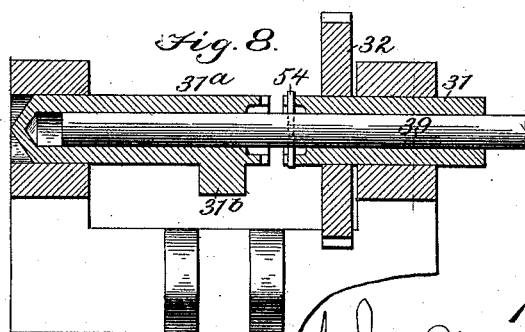
Witnesses
Inventor (No Model.)  4 Sheets—Sheet 4.
J. W. CULMER.
COMPUTING SCALE.
No. 486,663.  Patented Nov. 22, 1892.
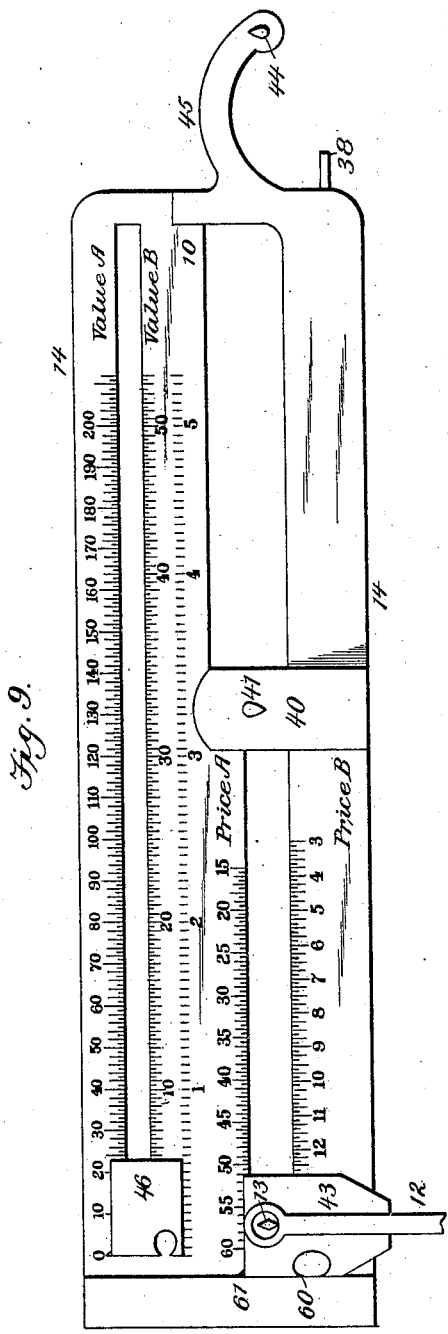
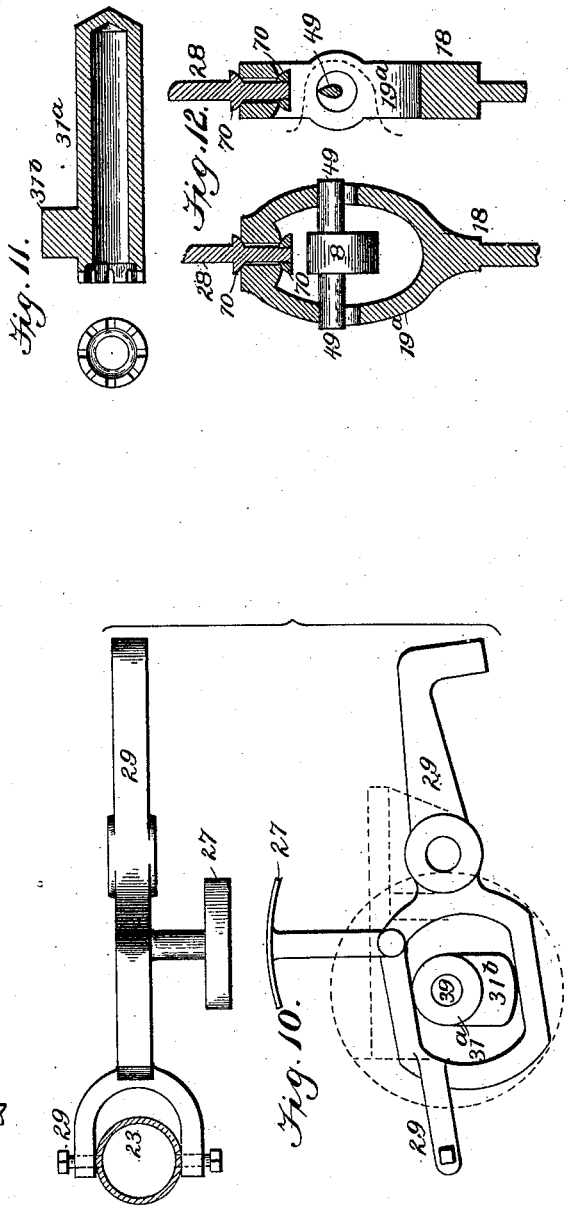
Witnesses
Inventor
By
his Attorneys.

UNITED STATES PATENT OFFICE.

JOHN WOODRUFF CULMER, OF NEW BRIGHTON, PENNSYLVANIA, ASSIGNOR TO THE COMPUTING SCALE COMPANY, OF DAYTON, OHIO.

COMPUTING-SCALE.

SPECIFICATION forming part of Letters Patent No. 486,663, dated November 22, 1892.

Application filed February 11, 1892. Serial No. 421,161. (No model.)

*To all whom it may concern:*

Be it known that I, JOHN WOODRUFF CULMER, a citizen of the United States, residing at New Brighton, in the county of Beaver and State of Pennsylvania, have invented certain new and useful Improvements in Computing-Scales, of which the following is a specification.

It is the object of this invention to make a computing-scale in which there shall be no friction or binding in the operation of the devices connecting the weighing with the computing devices, whereby the pivots and bearings of the value or computing and weighing beams are prevented from wear and greater accuracy obtained. This I accomplish by the provision of a flexible coupling connection between such beams and in the provision of co-operating means for lifting the pivots of the computing-beam out of the bearing-contact and for locking the scales in changing the relation of the value or computing-beam with the weighing-beam in the operation of weighing any article. It will be understood that these novel provisions are designed for co-operative action in a computing-scale, in which, while the weighing devices proper have a fixed relation by which the weight of a given article may be properly indicated, there is a computing-beam connected to and operated by the weighing-scales and having a movable or adjustable fulcrum, whereby the relation of said computing-beam may be changed as regards the weight-beam, and computations based upon such changed relation are effected.

In the drawings I have illustrated my invention in a platform counter-scale organized to operate upon the principle stated.

In the drawings, Figure 1 shows such scale in perspective complete. Fig. 2 is a front elevation of the same. Fig. 3 is a side elevation of the same. Fig. 4 shows a partial longitudinal elevation, particularly illustrating the flexible coupling connection between the value or computing beam and the weighing-beam, the mechanism for operating the carriage, and the device for controlling or locking the coupled beams. Fig. 5 is a cross-section taken on the line *y*, Fig. 4. Fig. 6 is a vertical cross-section showing the carriage-operating devices. Fig. 7 is a side view of the same, and Fig. 8 is an axial section of the same. Fig. 9 shows the computing-beam enlarged. Fig. 10 shows the device which locks the weighing-beam, the beam-carriage, and lifts the forked tube which engages the link of the computing-beam; and Fig. 11 shows one of the tubular shafts of the carriage-operating device, and Fig. 12 shows a modified construction of the flexible rod which connects with the pivot of the beam-link.

A grocer's platform counter-scale is shown in Fig. 1, wherein the base contains the ordinary assemblage of levers, supporting a base-platform and terminating in a single pivotal bearing 3 in line with and supporting a vertical rod 18, which connects the computing and the weighing beams, as seen in Fig. 3. An elevated oblong open frame or cap 5 supports and carries the connected beams and their adjuvant devices, and is itself supported by two columns 4, rising from the base at one side of the platform. A carriage 6, of less length than the cap, is mounted thereon so as to have a sliding movement, and is retained in position by V-shaped feet 35, adapted to fit into corresponding grooves 36, formed in the edges of the cap, as seen in Fig. 5. The carriage is also an open frame, and at the middle of its length rises a bifurcated standard 7, on which the value or computing beam 14 is mounted, so as to balance by the pivot-bearings 41 at the upper bifurcated end of the standard. A horizontal pin 38 at the poise-supporting end of this beam stands within an opening in a guard 37, rising from the carriage, and serves to permit the rocking motion of the beam within certain limits. A rack 26 is secured longitudinally within the carriage, extending from one end to the middle thereof and engages with a pinion 32 below the rack on a transverse tubular shaft 31, mounted in suitable bearings in the cap-frame 5 at one side of the vertical jointed rod, and by which gear the carriage is operated and which gear also serves to operate a device for locking the connected beams of the scale in a way and for a purpose which I will presently state. At or near the middle of the length of the cap-frame is permanently attached the clevis-formed hanger 9, having bearings for the reception of the fulcrum or central pivot 48 of the weight-beam or counter-lever 8, which hangs horizontally below the cap-frame. At the shorter extremity this beam is bifurcated and has a pivot 49, upon which rests the upper bearing 19 of the vertical rod 18, the upper end of which is pivoted to the upper rod 28, which is at its upper end pivoted to the beam-link 43, as seen in Figs. 4 and 5. It will be seen now that the weight-beam pivot carries the weight of the platform and the levers supporting it, the vertical jointed rods 18 and 28, and the link 43, and that said weight-beam being adjusted by means of the balance-ball 51 the scale so far as it constitutes a weighing-machine is in balance.

I prefer to form the upper bearing of the rod 18 by a goose-neck bend terminating in a horizontal bearing-arm 19, which stands inward and overhangs the said pivot 49 and rests upon its knife-edge between the bifurcated end of said weight-beam. The upper end of the jointed rod is forked, so as to receive the beam-link between the forks and allow it to be supported by the pivot 13, which passes through the link and the fork, which latter has a free limited movement thereon and supports the link. The link has a vertical slot, through which the computing-beam passes below the said pivot 13 and on which the beam has a sliding movement, as I shall presently state.

On the under side of the cap-frame is firmly secured a plate 52, having block or lug bearings for the tubular transverse shafts 31 and 31$^a$, which stand separated a short distance at their inner ends, as seen in Figs. 6 and 8. A cam 31$^b$ is fixed on the tubular shaft 31$^a$ and engages the yoke of a lever 29, the fulcrum of which is fitted in lug-bearings in the said plate 52 at one side of the tubular cam-shaft 31$^a$, so that the latter will be between the vertical jointed rod and the fulcrum of said lever. One end of this lever is bent down and stands in position to be depressed upon the weight-lever 8 for a purpose which I shall presently state. The other end of this lever 29 is forked and fitted to pivotally engage the circumference of a tube 23 at its lower end and which extends upward, inclosing the jointed rod 28, and terminates in two arms 11, the upper ends of which extend to the pivots 13 of the jointed rod, and are slotted at 11$^a$ to move vertically over said pivots for a purpose which I shall presently state. The tube is fitted to move freely within a hollow column 10, which is screwed into a cross-plate of the cap-frame, and its height is such as to form a stop to limit the descent of the tube, the junction whereof with the arms 11 form shoulders on the tube, which stand over and rest on the top of the hollow standard to form such stop, while the ascent of the tube is limited by the stroke of the lever, which is limited by the contact of its bent end upon the weight-beam. The raising of this tube is effected by this lever, and when so raised the arms or fork by their slots 11$^a$ embrace the pivots 13, and by contact therewith raise them from their bearings in the fork 12 of the rod 28, whereby the edges of said pivots 13 or the seat in said bearings are prevented from being worn by the motion of the carriage. For this purpose it will be seen that the holes in the upper ends of the fork 12 are larger than the bearing ends of the pivots 13, and it will be understood that the extent of movement of the lever 29 and of the tube 23 is only sufficient to bring the slotted ends of the fork 11 in contact with said pivots to raise them just so that they will not rest on the bearings of the fork 12 to relieve the bearings of wear in the operation of weighing, which I will hereinafter more particularly explain.

As I have stated, the tubular shafts are for operating the devices for relieving the wear of the link-bearing pivots 13 and for moving the carriage, respectively. I will now describe the means for operating these devices independently. A shaft 39 is fitted within the hollow sleeves so as to have a free rotary and longitudinal movement therein, and it is provided with means by which it may be alternately engaged with the said tubular shafts to revolve them. I have shown a very simple engaging device for this purpose in Figs. 6, 7, and 8; and it consists in forming radial notches on the inner ends of the tubular shafts and providing the shaft 39 with a pin 54, so as to project between the ends of the tubular shafts, so that by drawing the inner shaft out its pin will engage the notches of the tubular shaft 31, and the two can be turned together to move the carriage by the gear. By pushing in the inner shaft its pin will engage the notches of the other tubular shaft 31$^a$, and the two can be turned together to operate the lever 29 and its connected devices by the cam 31$^b$. The shaft 39 passes through an opening in the front side of the cap and has a hand-wheel 33, by which it is operated.

The computing-beam is supported and balanced upon a pivot 41, which passes through the block 40 and rests in bearings on the standard 7 of the carriage. At one end this beam passes freely through a slot in a link 43, which is in balance, independently of the computing-beams, upon the vertical rod 28 by the pivots 13. The other end of the beam terminates in a goose-neck 45, which has a pivot 44 for a hanging poise 22. The beam is preferably made of brass, and consists of three distinct parallel divisions, which may be limited at their extremities or at other points, or may be etched, engraved, or stamped upon one continuous plane surface. Upon that portion of the beam 14 embraced by the link 43 there are two parallel series or divisions, which may be of any fixed or determined size, that shown being one-sixteenth inch. Those on the lower side are arranged in groups of eight such subdivisions, each group representing one cent and each subdivision one-eighth of one cent in price, while those on the upper series are groups of ten such subdivisions, each group representing five cents and each subdivision of one-sixteenth inch one-half cent in price. From this it will be seen that each upper subdivision represents four times the value of the subdivisions immediately beneath it. The topmost division of the beam is subdivided by sixteenths inch, and each of these subdivisions represents one cent in value at any point indicated by the link 43 upon the price-division A of the upper series. The second parallel division-value B in the beam is also subdivided by sixteenths, and each subdivision represents one-fourth cent at any point indicated by the link 43 upon the lower series of price-subdivisions B. A third series of divisions is arranged below the second value-subdivisions B for convenience in weighing by pounds and ounces when the link 43 is set at "10 cents" upon the lower price series. This weight series has its divisions extending downward from ten, twenty, thirty, forty, and fifty cents of the lower value series, and these divisions which represent pounds are subdivided into half-ounces or less subdivisions, if desired.

Now, looking at Fig. 9, it will be seen that the sliding poise 46 indicates by its position upon one of these parallel series the weight or the value according to the point upon the price-beam 14 of the link 43, and that as the price-beam, with its poise 46 at zero, is in the balance of itself any weight upon the platform 2 of the scale will act upon the said price-beam in the exact ratio of the distance of the movable fulcrum furnished by the pivots 13 of the link 43 from the fixed fulcrum of the pivot 41. That portion of the price-beam extending from the center of balance (which is the edge of the pivot 41) to its outer end may be divided into any given number of equal divisions for prices, and the upper parallel value-divisions with their sliding poise must be of a like relation. It is evident, therefore, that the action of the movable fulcrum 13 at any one of such price-divisions will be in the ratio (as to leverage) as the distance between 13 and 14 is to the whole length of the price-beam.

The counter-lever or weight-beam 8 is fitted with a lower beam 16, subdivided into half-ounce divisions and provided with a sliding poise 17. A poise 22 hangs from a pivot 50 at that end of the beam 8 below the hanging poise of the price-beam, and a ball 51 serves to balance the said weight-beam.

In operating the scale, if, for example, it is desired to find the value of a roll of butter at forty cents a pound the carriage is moved by means of the hand-wheel 33 until the pointer 61, Fig. 9, of the link 43 is at the figure "40" of the upper price series, the shaft 39 is pushed in, and its pin 54 is thereby engaged with the notches in the end of the tubular shaft 31$^a$, which is then rotated until its cam 31$^b$ actuates the lever 29 to draw the tube 23 down, and thus disengages the forked slots 11$^a$ from the pivots 13, as seen in Fig. 4. This movement of the lever 29 also depresses a clamp-bolt 27, which is pivoted to said lever, and rising therefrom has a spring-clamp plate, which overhangs the rack-bar 26 and exerts a clamping pressure thereon, and thereby serves to lock the carriage to the standard cap to hold it in the position to which it was moved by said rack and hand-wheel shaft-gear. The sliding poise 46 is then moved until the scale balances at, say, "180." The value thereby indicated is one dollar and eighty cents, and as the pointer 60 of the link 43 is at "10" in the lower series of prices the poise 46 will at the same sime indicate four and one-half pounds on the weight series of divisions.

If now it is desired to find the value of a package of corn at five cents a pound, the hand-wheel is turned and the lever 29 moved by the cam 31$^b$ until the tube 23 rises to bring its slotted arms 11$^a$ up against the pivots 13, and thereby lifts them from their bearings in the rod-fork 11, and thus prevent wear from friction at these pivot-bearings in the adjustments of the beam in weighing. This movement of the lever to depress the tube at the same time raises the clamp-bolt from contact with the rack-bar 26, and the carriage is unlocked and free to be again moved. The wheel-shaft 39 is now drawn out, and the pin 54 is thereby disengaged from the notches in the end of the tubular shaft 31$^a$ and is engaged with the notches in the end of the tubular shaft 31, which latter with its gear-wheel 32 is then rotated and the carriage, by means of its rack, is moved until the figure "5" on the lower series of price-divisions is under the pointer 60 of the link 43 and the poise 46 is slid out until the beam balances at, say, twenty of the second or lower series of value-divisions. It will thus be seen that the tare of a vessel or package may be balanced in weight upon the beam 16 and the value of its contents found at any given price upon the computing-beam, and that additional weights of fixed even value may be used upon the swinging poises 22 22 and the surplus in fractional quantity or value found upon the value-beam.

Referring now more particularly to the primary object of my invention, which is to avoid the wear upon the bearings of the computing-beam, I will state that inasmuch as in a scale of this class the arc described by the weighing-beam is fixed, while that described by the computing-beam varies as the beam is moved forward or backward within the link, it is therefore necessary that the coupler or connection between the weighing-beam and the computing-beam shall have sufficient flexibility to compensate for this difference and to allow the two arcs to be described together without friction or binding. For this purpose I provide the flexible or jointed coupling for the two beams, the construction and function of which I will now more fully explain. The upper portion of the rod 18 is provided with a suitable bearing 19 and above this bearing the rod terminates with the jointed connection, which in Fig. 4 is made by a slot standing in the line of the beam and a pin 20, which pivots the lower tongued end of the coupler-rod 28 in said slot, so that said rod may rock upon said pin 20 sufficiently to permit of the differences between the greater and the less arcs described by the value-beam and the fixed arc described by the weighing-beam. For this purpose an alternative form of joint is shown in Fig. 12. In this joint the pivots 49 pass through the stirrup-bearings in a link 19$^a$, which forms the upper end of the rod 18. The top of this link is bored out vertically for the reception of the coupler-rod 28, the lower end of which has its bearings in the convex nuts 70 70, and the motion in this case is a limited one in any direction.

As my invention consists, essentially, of the above-described flexible connection for the beams, the computing-beam, and the mounting of such beam upon a carriage longitudinally movable on a cap in relation to the weighing-beam, it is obvious that these parts and combinations of parts may, if desirable, be added to the ordinary scale now in use.

Referring to Figs. 1 and 2, a rack 3$^c$ is secured to the base between the columns 4 for holding the extra weights for use with swinging poises, and at one end this rack is made tubular and the vertical rod 18 is passed through it to the platform-levers, so that this tubular rack part serves to prevent the entrance of dirt through the platform-opening, which would otherwise occur and accumulate upon the levers. The columns are preferably curved outward to give greater space for the operation of the weight-beam. The cap is cast with the cross-plates for the attachment of the column 10 and the hanger 9 and gives the advantage of easy working by machine-tools, renders said cap interchangeable, and when erected affords easy access to the working parts of the weight-levers and facilitates the adjustments. The carriage by its construction is also made interchangeable and can be readily finished and applied.

In Figs. 1 and 4 the computing-beam is seen as having two independent pivot-bearings, one of which 41 has a sliding relation to the fixed frame-cap 5 and a fixed relation to the beam, and the other 13 has a fixed relation to the cap 5 and permits the beam to slide; but the weight of the beam is supported by its fulcrum-pivot bearings 41. As the jointed coupling-rod has a free vertical limited play over the beam-pivots 13, the beam is thereby permitted to have free slight longitudinal tilting movement on the fulcrum-pivots, so that the beam may have a free sliding movement over and upon the link 43 of the said pivot-bearings 13. For limiting this tilting movement of the beam I provide that end of the beam next the fulcrum-bearings 41 with a pin 38, which stands in the eyed or slotted end of an arm 37, fixed to the beam-carriage. These independent pivot-bearings are shown as arranged in the same horizotal plane and mediately of the width of the beam, so that the latter slides in the line of said pivots in fixed relation to the fulcrum-pivots and over a pointer-link 43, having the other set of pivots.

While I have described in the foregoing specification what I term a "platform-scale," I desire it to be understood that such statement is not intended to limit all my said inventions to their employment in such type of scale, and I wish also to state that many of the combinations and details above described are not essential to some of my said inventions, broadly considered. All this will be indicated in the concluding claims, as in any claim the omission of an element or the omission of reference to the particular construction of the element mentioned is intended to be a formal declaration of the fact that the omitted elements or features are not essential to the invention therein covered.

Having described a computing-scale embodying in preferred form the several features of my present invention in combination, what I separately claim, and desire to secure by Letters Patent, is—

1. The combination, with the computing-beam and the weight-beam, of a rod connecting said beams, having a flexible joint between such connections, whereby said rod will adapt itself to the variations in the vibrations of the said beams in the efficient working of the scale, substantially as described.

2. The combination, with the computing and weighing beams of a weighing and price scale, placed the one above the other, of a rod adapted to connect the weight-carrying levers with the said beams, composed of a lower and an upper part which are flexibly connected at a point between the weighing and computing beams, the said lower part having a pivot connection with the said weighing-beam, substantially in the manner and for the purpose set forth.

3. The combination, with the computing and weighing beams of a weighing and price scale, of a rod composed of an upper and a lower part, adapted to connect the weight-carrying levers with the said beams, the upper part having pivotal connection with a link through which the computing-beam slides and having its lower end flexibly jointed with the said lower part, which latter has a knife-edge bearing 19 on the weighing-beam and a limited pivotal movement relative to the said upper part, substantially as described.

4. In a weighing and price scale, the combination of the computing-beam, a slotted link within which the said beam slides, having pivot-bearings and a weight-beam, with a rod connecting the link-pivots and the weight-beam and having a flexible joint between such connections, and mechanism for engaging said link-pivots for lifting them out of bearing contact with said rod, substantially as described, for the purpose stated.

5. In a weighing and price scale, the combination, with the traversing computing-beam, a link for the computing-beam to slide through, and a rod connecting the weighing mechanism with the said link and having pivotal connection with the said link, of a tube having a limited vertical movement and having vertical members which project up on each side of the computing-beam and which are adapted to receive the projecting ends of the rod and link pivots, and actuating mechanism for lifting said tube, substantially as and for the purpose described.

6. In a weighing and price scale, the combination, with the carriage supporting the computing-beam, having a rack and a locking mechanism to secure the carriage in the proper position, of two tubular shafts in axial alignment, a gear-wheel on one of said shafts to mesh with the rack-bar and move the carriage and a cam on the other of said shafts to actuate the said locking mechanism, and a hand-operated shaft concentric with and adapted to have a rotary and a longitudinal movement relative to the said tubular shafts and constructed to engage with each to move or lock the carriage, substantially as set forth.

7. In a weighing and price scale, the combination, with the carriage supporting the computing-beam and a locking mechanism to secure the carriage at the located position, of two axially-aligning tubular shafts constructed, respectively, to move the carriage and actuate the said locking mechanism, and a shaft adapted to have longitudinal and rotary movement within the said tubular shafts and having a pin which is adapted to be brought in engagement with each of the said tubular shafts on moving the said inner shaft longitudinally to lock the said shaft to either of the said tubular shafts, substantially as and for the purpose described.

8. In a weighing and price scale, the combination, with the carriage supporting the computing-beam, a locking-clamp to secure the carriage in the required position, and a lever for actuating the said locking-clamp, of two tubular shafts in axial alignment, one constructed to move the carriage, the other to actuate the lever in each direction, and a shaft located within and adapted to have a longitudinal and rotary movement relative to the said tubular shafts and having a pin to engage with either of the tubular shafts to lock it to the central shaft to move the carriage or actuate the lever, substantially as described, for the purpose specified.

9. In a platform-scale, the combination, with the weighing and computing beams, a carriage supporting the computing-beam, and a rod connecting the computing-beam with the weighing mechanism and having pivotal connection with a link through which the computing-beam slides, of the tube 23, having arms 11ª, adapted to engage with the pivots of the said link, a lever 29, having engagement with the said tube 23, a locking-clamp for securing the carriage at the desired position, having connection with the said lever 29, two axially-aligning tubular shafts, the one constructed to move the carriage, the other to actuate the lever 29, and a shaft adapted to have a longitudinal and a rotary movement within the said tubular shafts and having a pin to engage with and lock the said shaft with either of the tubular shafts, substantially as described, for the purpose specified.

10. In a computing-scale, the combination, with a computing-beam and a weight-beam, of a vertical rod having a free pivotal connection with a link on said computing-beam, a bearing connection on the weight-beam, a flexible joint in itself between such connections, and a pivotal connection with the platform or scale levers, whereby in the operation of the scale the difference between the fixed arc described by the weight-beam and the variable arc described by the computing-beam is compensated for without friction.

11. The combination, in a computing-scale, of the computing and weighing beams, with a flexibly-jointed rod and link for connecting these parts, substantially as described, a carriage for the computing-beam, a vertically-adjustable tube forked and slotted at its upper end, and means, substantially such as described, for operating and locking the carriage and the forked tube in the way described, whereby the carriage is operated without wear upon the pivots or bearings and is locked while weighing, so that the mechanism is held steady and accuracy obtained.

12. The combination, with weighing mechanism, of a computing-beam adapted to have a sliding movement, bearing-pivots with which it has both fixed and movable relation, a pointer-link on said beam, having the pivot-bearings with which the beam has movable relation, and a jointed rod connecting the said beam with the weighing mechanism, for operation in the way substantially as described.

13. The combination, with weighing mechanism, a movable computing-beam, a slide-link on said beam, having pivot-bearings, a carriage bearing said computing-beam, and a weight-beam, of a rod connecting said link-pivots and weight-beam, having a flexible joint between such connections, a tube having slotted arms for engaging said link-pivots, a lever engaging said tube and having a rigid arm and a pivoted clamp, means for operating said arm and clamp simultaneously, the one to hold the carriage and the other to hold the weight-beam, and suitable means for independently operating the carriage and the lever.

14. The combination, with the weighing mechanism, a computing-beam, a carriage bearing said beam, and a weight-beam, of a rod connecting said beams, having a flexible joint between such connections, substantially as described.

15. The combination, with weighing mechanism, a computing-beam, a carriage bearing said beam, and a weight-beam, of a rod connecting said beams, having a flexible joint between said connections, a slide-link on said computing-beam, having bearing-pivots engaging the upper end of said jointed rod, and a lifting device adapted to engage said link-pivots, substantially as described.

16. The combination, with weighing mechanism, a computing-beam, a carriage bearing said beam, a slide-link on said beam, having pivot-bearings, and a weight-beam, of a rod connecting said link-pivots and weight-beam, having a flexible joint between such connections, a lifting device adapted to engage said link-pivots, a clamp connecting said lifting device, and a cam device engaging said lifting device for operating it and the clamp, substantially as described.

17. The combination, in a weighing and price scale, of the computing-beam and the weight-beam, a slide-link on said computing-beam, a rod loosely connecting said link and weight-beam, having a flexible joint between such connections, a tube having arms adapted to engage said link, a yoke-lever engaging said tube and having an arm adapted to engage said weight-beam, a clamp connecting said yoke-lever, a hollow column forming a stop for said tube, a carriage bearing said computing-beam, and suitable means for operating said carriage, the yoke-lever, its arm, its clamp, and the tube, substantially as described.

18. In a weighing and price scale, a computing-beam constructed with three separate divisions arranged in groups of determined size, substantially as described, in combination with a slide-link 43 and a poise 46, the lower division forming an upper and a lower series with which the said link 43 coacts, representing the price-division A and B, the upper division representing the value series A and the intermediate division representing both the value and weight series B, the poise 46 coacting with said upper and intermediate series, whereby the value and price of the article being weighed is determined, as described.

In testimony whereof I have signed this specification in the presence of witnesses.

JOHN WOODRUFF CULMER.

Witnesses:
O. O. OZIAR,
L. F. KEPLER.